US010761191B2

(12) United States Patent
Qiu et al.

(10) Patent No.: US 10,761,191 B2
(45) Date of Patent: Sep. 1, 2020

(54) SYSTEMS AND METHODS FOR LIDAR DETECTION

(71) Applicant: SUTENG INNOVATION TECHNOLOGY CO., LTD., Shenzhen (CN)

(72) Inventors: Chunxin Qiu, Shenzhen (CN); Letian Liu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/597,814

(22) Filed: Oct. 9, 2019

(65) Prior Publication Data

US 2020/0150237 A1     May 14, 2020

Related U.S. Application Data

(63) Continuation of application No. PCT/CN2019/096858, filed on Jul. 19, 2019.

(30) Foreign Application Priority Data

Jul. 20, 2018 (CN) .......................... 2018 1 0800008
Jul. 20, 2018 (CN) .......................... 2018 1 0800022

(51) Int. Cl.
 *G01S 7/48* (2006.01)
 *G01S 7/481* (2006.01)
 *G01S 17/931* (2020.01)

(52) U.S. Cl.
 CPC .......... *G01S 7/4813* (2013.01); *G01S 7/4804* (2013.01); *G01S 17/931* (2020.01)

(58) Field of Classification Search
 CPC ....... B60R 1/00; B60R 21/36; B60R 21/0134; B60R 21/013; B60R 2021/01013; G01S 17/04; G01S 17/931; G01S 17/86; G01S 7/486; G01S 17/89; G01S 17/894; G08G 1/166; B60G 17/019
 See application file for complete search history.

(56) References Cited

U.S. PATENT DOCUMENTS

| | | | |
|---|---|---|---|
| 2010/0020306 A1* | 1/2010 | Hall | H01S 5/0428 356/5.01 |
| 2013/0242284 A1* | 9/2013 | Zeng | G01S 17/66 356/4.01 |
| 2016/0003946 A1* | 1/2016 | Gilliland | G01S 17/894 356/5.01 |

* cited by examiner

*Primary Examiner* — Luke D Ratcliffe
(74) *Attorney, Agent, or Firm* — Bayes PLLC

(57) ABSTRACT

Embodiments of the disclosure provide a LiDAR assembly. The LiDAR assembly includes a central LiDAR device configured to detect an object at or beyond a first predetermined distance from the LiDAR system and an even number of multiple auxiliary LiDAR devices configured to detect an object at or within a second predetermined distance from the LiDAR system. The LiDAR assembly also includes a mounting apparatus configured to mount the central and auxiliary LiDAR devices. Each of the central and auxiliary LiDAR devices is mounted to the mounting apparatus via a mounting surface. A first mounting surface between the central LiDAR device and the mounting apparatus has an angle with a second mounting surface between one of the auxiliary LiDAR devices and the mounting apparatus.

19 Claims, 12 Drawing Sheets

100

SYSTEMS AND METHODS FOR LIDAR DETECTION

CROSS-REFERENCE TO RELATED APPLICATION(S)

This application is continuation of International Application No. PCT/CN2019/096858, filed Jul. 19, 2019, entitled "SYSTEMS AND METHODS FOR LIDAR DETECTION," which claims priority to Chinese Patent Application No. 201810800022.4, filed on Jul. 20, 2018, entitled "FIXING DEVICE FOR LASER RADAR SENSING SYSTEM," and Chinese Patent Application No. 201810800008.4, filed on Jul. 20, 2018, entitled "LIDAR SENSING SYSTEM AND LIDAR SENSING SYSTEM DETECTING METHOD," the entire contents of which are incorporated by reference.

TECHNICAL FIELD

The present disclosure relates to light detection and ranging (LiDAR) devices, and more particularly to, LiDAR detection using multiple auxiliary LiDAR devices to aid detections based on a specially designed mounting apparatus.

BACKGROUND

Autonomous driving technology relies heavily on navigation maps. For example, accuracy of navigation maps is critical to functions of autonomous driving vehicles, such as positioning, ambience recognition, decision making, and control. LiDAR systems have been widely used in autonomous driving and producing such maps. For example, LiDAR systems measure distance to a target by illuminating the target with laser light and measuring the reflected light with a sensor. Differences in laser return times and wavelengths can then be used to make digital three-dimensional (3D) representations of the target. The laser light used for LiDAR scan may be ultraviolet, visible, or near infrared. Because using a narrow laser beam as the incident light from the scanner can map physical features with high resolution, a LiDAR system is particularly suitable for applications such as sensing in autonomous driving and map surveys.

A typical LiDAR system normally includes a rotating (scanning) part that can be used for emitting laser beams and receiving the reflected light over a wide range of scanning angles, and a stationary part fixed to a vehicle and used for providing control signals and power to the rotating part and receiving sensing signals obtained by the rotating part. The more the laser beams the LiDAR system uses for scanning, the more thorough the LiDAR system can detect the surroundings. Typical LiDAR systems use a 32-beam LiDAR device for generating navigation maps to aid autonomous driving.

However, detection range and mapping accuracy of a single-LiDAR system may be limited by the physical characteristics of the LiDAR itself, such as the mounting position of the LiDAR system with respect to the vehicle and the field of view of the LiDAR device. As a result, the single-LiDAR system used with an autonomous driving vehicle may have blind spots in its detection range, and detection failure also occurs in some instances.

Embodiments of the disclosure address the above problems by providing systems and methods for LiDAR detection using multiple LiDAR devices.

SUMMARY

Embodiments of the disclosure provide a LiDAR assembly. The LiDAR assembly includes a central LiDAR device configured to detect an object at or beyond a first predetermined distance from the LiDAR system and an even number of multiple auxiliary LiDAR devices configured to detect an object at or within a second predetermined distance from the LiDAR system. The LiDAR assembly also includes a mounting apparatus configured to mount the central and auxiliary LiDAR devices. Each of the central and auxiliary LiDAR devices is mounted to the mounting apparatus via a mounting surface. A first mounting surface between the central LiDAR device and the mounting apparatus has an angle with a second mounting surface between one of the auxiliary LiDAR devices and the mounting apparatus.

Embodiments of the disclosure also provide a LiDAR system. The LiDAR system includes a central LiDAR device configured to detect an object at or beyond a first predetermined distance from the LiDAR system and an even number of multiple auxiliary LiDAR devices configured to detect an object at or within a second predetermined distance from the LiDAR system. The LiDAR system further includes a processor. The processor is configured to synchronize the central LiDAR device and at least one of the multiple auxiliary LiDAR devices for acquiring data frames. The processor is also configured to combine a first data frame acquired by the central LiDAR device with at least one of a plurality of second data frames acquired by the multiple auxiliary LiDAR devices, thus generating a first combined data frame. The processor is further configured to identify a first target object from the first combined data frame.

Embodiments of the disclosure also provide a method for detection by a LiDAR system. The method includes providing a central LiDAR device configured to detect an object at or beyond a first predetermined distance from the LiDAR system and an even number of multiple auxiliary LiDAR devices configured to detect an object at or within a second predetermined distance from the LiDAR system. The method also includes synchronizing the central LiDAR device and at least one of the multiple auxiliary LiDAR devices for acquiring data frames. The method further includes receiving, by the central LiDAR device, a first data frame and receiving, by the multiple auxiliary LiDAR devices, a plurality of second data frames. The method further includes combining the first data frame and at least one of the plurality of second data frames. The method further includes generating a first combined frame and identifying a target object from the first combined data frame.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

One way to solve the above problem is to increase the number of laser beams to 64 or 128. Although the accuracy may be improved (e.g., by reducing the rate of detection failure and including more details in the generated navigation maps), the problem of undetectable areas (such as blind spots) still exists. Thus, it is challenging for the conventional LiDAR systems or assemblies to meet the increasing demand for high quality high-definition maps used for autonomous driving or other purposes.

A different solution to the above problem is disclosed herein by combining a plurality of LiDAR devices to cover more areas and to acquire more information of objects (e.g. road marks, curbs, trees, pedestrians, bicycles, vehicles, roadblocks, etc.) within the field of view (FOV). The FOV of a LiDAR device is the extent of surrounding areas observable by that LiDAR device. In some embodiments, a LiDAR FOV may include a vertical FOV and a horizontal FOV. For example, the RS-Ruby LiDAR designed by RoboSense™ has a 40-degree vertical FOV and a 360-degree horizontal FOV. In order to control the cost and maximize the benefit of combining multiple LiDAR devices for generating navigation maps, embodiments of the present disclosure provide improved systems and methods for combing multiple LiDAR devices to generate navigation maps and, in most instances, high-definition maps.

According to some embodiments, the improved systems and methods may combine a central LiDAR device and an even number (e.g., 2, 4, 6, 8 or 2N, where N is a natural number) of multiple auxiliary LiDAR devices to generate high-definition maps. The systems and methods may use the central LiDAR device to detect objects at or beyond a first predetermined distance from the LiDAR system, and may use the multiple auxiliary LiDAR devices to detect objects at or within a second predetermined distance from the LiDAR system. The improved systems and methods may also combine the data frames acquired by the central LiDAR device and the multiple auxiliary LiDAR devices using a fusion method. Also, to maximize the benefit of combining the LiDAR devices, the central LiDAR device and the multiple auxiliary LiDAR devices may be mounted on a specially designed mounting apparatus.

Figure 1:
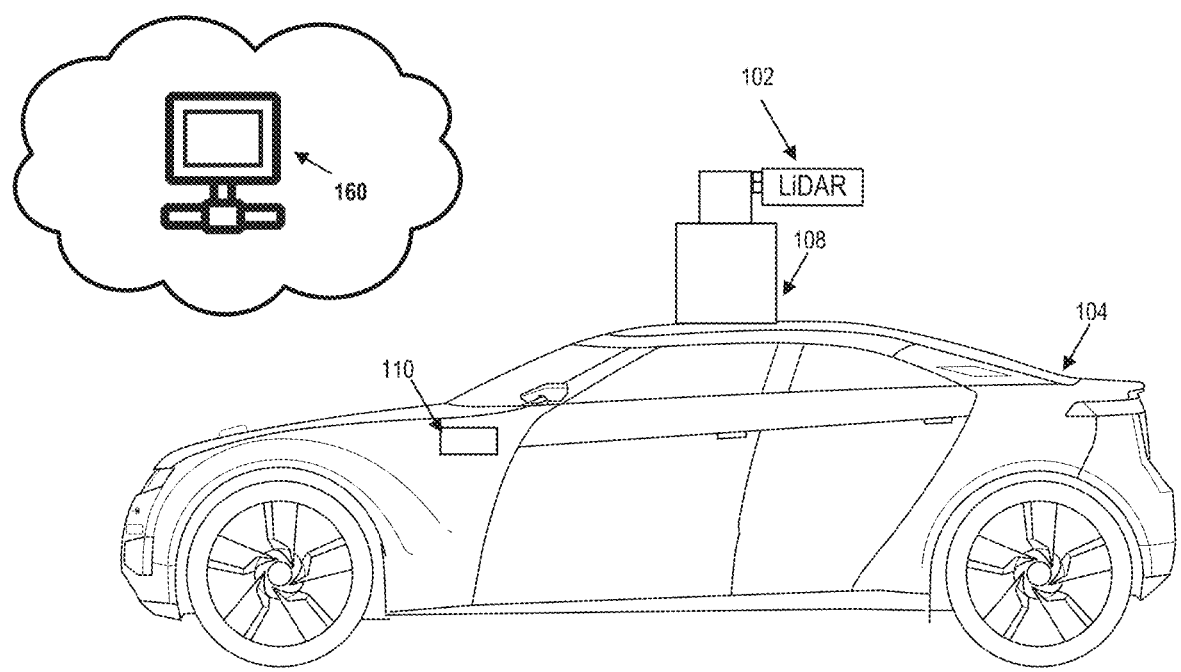
FIG. 1 illustrates a schematic diagram of an exemplary vehicle equipped with a LiDAR sensing system, according to embodiments of the disclosure.

FIG. 1 illustrates a schematic diagram of an exemplary vehicle 100 equipped with a LiDAR optical signal detection system 102 (or LiDAR system 102 for simplicity), according to embodiments of the present disclosure. Consistent with some embodiments, vehicle 100 may be an autonomous driving vehicle or a survey vehicle configured for acquiring data for constructing a high-definition map, 3D buildings, terrestrial features, or city modeling.

As illustrated in FIG. 1, vehicle 100 may be equipped with a LiDAR assembly that includes LiDAR system 102 mounted to a body 104 via a mounting apparatus 108. Mounting apparatus 108 may be a mechanical or electromechanical structure installed or otherwise attached to body 104 of vehicle 100.

It is contemplated that vehicle 100 may be an electric vehicle, a fuel cell vehicle, a hybrid vehicle, or a conventional internal combustion engine vehicle. Vehicle 100 may have a body and at least one wheel. The body may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have more or less wheels or equivalent structures that enable vehicle 100 to move around. Vehicle 100 may be configured to be all wheel drive (AWD), front wheel drive (FWD), or rear wheel drive (RWD). In some embodiments, vehicle 100 may be configured to be operated by an operator occupying the vehicle, remotely controlled, and/or autonomously.

As will be disclosed in detail below, mounting apparatus 108 may include specially designed structures configured to mount LiDAR system 102. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 110 can provide real-time location and pose information of vehicle 100 as it travels, including the positions and orientations (e.g., Euler angles) or even speed of vehicle 100 at each time point while traveling.

It is contemplated that the manners in which sensor 110 can be equipped on vehicle 100 are not limited by the example shown in FIG. 1 and may be modified depending on the types of sensor 110 and/or types of vehicle 100 to achieve the desirable sensing performance.

Consistent with some embodiments, LiDAR system 102 and sensor 110 may be configured to capture data as vehicle 100 moves along a trajectory. For example, LiDAR system 102 is configured to scan the surrounding environment and acquire data frames, which are used to generate point clouds. LiDAR system 102 may include more than one LiDAR devices (which will be disclosed in detail below) configured to measure distance to a target by illuminating the target with laser beams and measuring the reflected light with a receiver. The laser beams used by LiDAR system 102 may be ultraviolet, visible, or near infrared. Because a narrow laser beam can map physical features with very high resolution, LiDAR is particularly suitable for high-definition map surveys. As vehicle 100 moves along the trajectory, LiDAR system 102 may continuously capture data. Each set of data captured within a certain time range is known as a data frame.

Consistent with the present disclosure, LiDAR system 102 and sensor 110 may communicate with server 160. In some embodiments, server 160 may be a local physical server, a cloud server (as illustrated in FIG. 1), a virtual server, a distributed server, or any other suitable computing device. Consistent with the present disclosure, server 160 may store data such as data frames collected by LiDAR system 102 or position and pose information collected by sensor 110.

Consistent with the present disclosure, server 160 may also be able to combine the data frames captured by LiDAR system 102 based on methods such as a fusion algorithm or other suitable algorithms. Server 160 may receive sensor data, process the sensor data, construct local high-definition maps based on the sensor data, and/or update high-definition maps based on the local high-definition maps. Server 160 may communicate with LiDAR system 102 and sensor 110, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth). The communication may include receiving data from the one or more LiDAR devices in LiDAR system 102 and from sensor 110 which indicates various road conditions and/or objects in the surrounding environment. These data can be used to generate point clouds and fusion images that allow the vehicle to recognize these conditions and/or objects.

Figure 2:
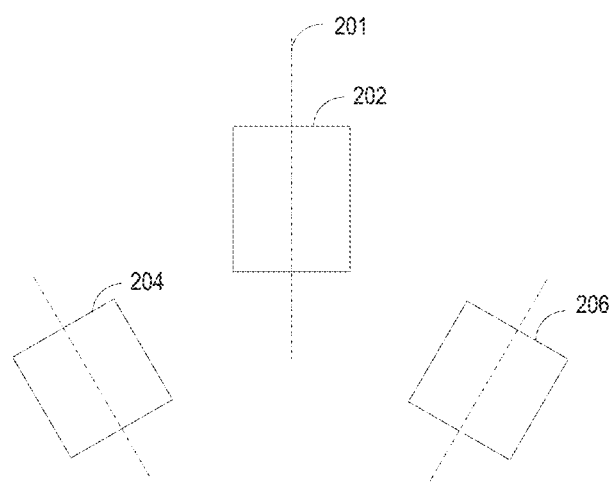
FIG. 2 illustrates a schematic diagram of an exemplary LiDAR device layout of a LiDAR system, according to embodiments of the disclosure.

FIG. 2 illustrates a schematic diagram of an exemplary LiDAR device layout of a LiDAR system 102, according to embodiments of the disclosure. In some embodiments, LiDAR system 102 may include, among other things, a central LiDAR device, and an even number (e.g., 2, 4, 6, 8 or 2N, where N is a natural number) of multiple auxiliary LiDAR devices. For example, as illustrated in FIG. 2, LiDAR system 102 may include a central LiDAR device 202, a first auxiliary LiDAR device 204, and a second auxiliary LiDAR device 206. It is contemplated that the example of two auxiliary LiDAR devices in FIG. 2 is for illustration purposes only, and that the number of the multiple auxiliary LiDAR devices is not limited to 2. It is further contemplated that the example of one central LiDAR device in FIG. 2 is also for illustration purposes only, and that the central LiDAR device may be formed by a cluster of LiDAR devices (e.g. two or more LiDAR devices) that collectively function as one integrated central LiDAR device.

In some embodiments, central LiDAR device 202 may be configured to detect objects at or within a first predetermined distance from LiDAR system 102. For example, the first predetermined distance from LiDAR system 102 may be set as several meters (e.g., 2 meters, 5 meters, 10 meters, 20 meters, 50 meters, or more). The detectable area and detection flexibility of central LiDAR device 202 may be enhanced when it is formed by a cluster of LiDAR devices.

Each of the plurality of LiDAR devices may be adjusted to function independently. Thus, if one operating LiDAR device cannot detect the environment with sufficient accuracy, one or more LiDAR devices may be turned on to compensate the detection result. In some embodiments, central LiDAR system 102 may be formed by a plurality of solid-state LiDAR devices that are rotationally disposed along an axis, so that they may operate collectively to achieve a 360-degree horizontal FOV of laser beam emission, which may imitate a rotating mechanical central LiDAR device.

According to some embodiments, first and second auxiliary LiDAR devices 204, 206 may be configured to detect objects at or within a second predetermined distance from LiDAR system 102. For example, the second predetermined distance from LiDAR system 102 may be set as several meters (e.g., 2 meters, 5 meters, 10 meters, 20 meters, 50 meters, or more). Therefore, auxiliary LiDAR devices 204, 206 may be used to primarily detect objects in the near-vehicle spaces that are not typically reachable by central LiDAR device 202. In some embodiments, the farthest distance an auxiliary LiDAR device may detect an object are the same among the multiple auxiliary LiDAR devices. In these embodiments, the farthest distance of any auxiliary LiDAR device may be defined as the second predetermined distance. In some other embodiments, the farthest distance an auxiliary LiDAR device may detect an object differs among the multiple auxiliary LiDAR devices. In these embodiments, the greatest of the farthest distances of all auxiliary LiDAR devices may be defined as the second predetermined distance.

In some embodiments, the first and second predetermined distances may be respectively preset as a fixed value by an operator of LiDAR system 102 before operating. Alternatively, each of these two values may be adjusted autonomously according to different needs or applications (such as distinct road conditions). In other embodiments, the first and second predetermined distances may be determined based on the performance of central LiDAR device 202 and first and second auxiliary LiDAR devices 204, 206. As an example, the adjustment may be carried out by changing the angle of which the LiDAR device(s) are mounted, and thus the angles of projection of the adjusted LiDAR device(s) may be changed accordingly.

According to some embodiments, the second predetermined distance may be equal to or greater than the first predetermined distance, such that there might be overlapping between the detectable areas of central LiDAR device 202 and those of first and second auxiliary LiDAR devices 204, 206. In these embodiments, no objects will be left undetected by the LiDAR system, thereby eliminating undesirable blind spots that exist in the current LiDAR systems.

According to some further embodiments, the second predetermined distance may be smaller than the first predetermined distance, so that the laser beams emitted from the auxiliary LiDAR devices can be focused more densely near the vehicle, thereby providing point clouds and navigations maps of higher definition than sparsely emitted laser beams which reach farther distances.

In some embodiments, as illustrated in FIG. 2, first auxiliary LiDAR device 204 may be configured to detect the left side of LiDAR system 102 and second auxiliary LiDAR device 206 may be configured to detect the right side of LiDAR system 102. It is further contemplated that when the even number of the multiple auxiliary LiDAR devices is larger than two, a first half of them may work collectively in a manner similar to first auxiliary device 204 as disclosed herein. The first half of the multiple auxiliary LiDAR devices may be mounted on the left side of central LiDAR device 202 via a mounting apparatus (not shown in FIG. 2). Thus, they are capable of detecting objects from the left side of LiDAR system 102 at or within the second predetermined distance from LiDAR system 102. Similarly, a second half of the multiple auxiliary LiDAR devices may work collectively in a manner similar to second auxiliary device 206 as disclosed herein. The second half of the multiple auxiliary LiDAR devices may be mounted on the right side of central LiDAR device 202 via a mounting apparatus (not shown in FIG. 2). Thus, they are capable of detecting objects from the right side of LiDAR system 102 and at or within the second predetermined distance from LiDAR system 102. Notably, first and second auxiliary LiDAR devices 204, 206 are only used for illustrative purpose and are not meant in any way to limit the number of the multiple auxiliary LiDAR devices to two.

In some embodiments, a central axis 201 of central LiDAR device 202 is orthogonal to a horizontal plane (e.g., a plane parallel to the sea level). Central axis 201 may be a normal line that passes the center of a bottom plane of central LiDAR device 202.

In some embodiments, one or more of the central LiDAR device and the multiple auxiliary LiDAR devices may be a multi-beam LiDAR device. Examples of a multi-beam LiDAR device may include 32-beam LiDAR device, 64-beam LiDAR device, or 128-beam LiDAR device. In some other embodiments, one or more of the central LiDAR device and the multiple auxiliary LiDAR devices may be versatile solid-state LiDAR devices or solid-state LiDAR devices. In some further embodiments, one or more of the central LiDAR device and the multiple auxiliary LiDAR devices may be flash LiDAR devices. It is contemplated that any suitable type of LiDAR devices may be used as the central LiDAR device and/or the multiple auxiliary LiDAR devices.

In some embodiments, first auxiliary LiDAR device 204 is disposed or mounted on the left side of central LiDAR device 202 and second auxiliary LiDAR device 206 is disposed or mounted on the right side of central LiDAR device 202. A central axis of first auxiliary LiDAR device 204 (e.g., the left-mounted auxiliary LiDAR device) is in a negative angle with the central axis of central LiDAR device 202, and a central axis of second auxiliary LiDAR device 206 (e.g., the right-mounted auxiliary LiDAR device) is in a positive angle with the central axis of central LiDAR device 202. The central axis of an auxiliary LiDAR device may be defined as a normal line that passes the center of a bottom plane of that auxiliary LiDAR device.

In the above-mentioned embodiments, whether an angle is negative or positive is relatively defined with respect to the central axis of central LiDAR device 202, as shown in FIG. 2. A negative angle means the central axis of central LiDAR device 202 can be rotated counter-clockwise to coincide with the central axis of first auxiliary LiDAR device 204. A positive angle means the central axis of central LiDAR device 202 can be rotated clockwise to coincide with the central axis of second auxiliary LiDAR device 206.

In some embodiments, first and second auxiliary LiDAR devices 204, 206 may be positioned at a same level (e.g. a plane that is parallel to the horizontal plane). For example, the centers of the first and second auxiliary LiDAR devices 204, 206 may be in the same horizontal plane (parallel to the seal level), which brings symmetry with respect to the detectable areas by these two auxiliary LiDAR devices. However, it is not required that the first and second auxiliary LiDAR devices 204, 206 be positioned at the same level. In some other embodiments, central LiDAR device 202 may not be positioned at the same level as first and second auxiliary LiDAR devices 204, 206. For example, the centers of first and second auxiliary LiDAR devices 204, 206 may not be in the same horizontal plane as the center of central LiDAR device 202.

Figure 3:
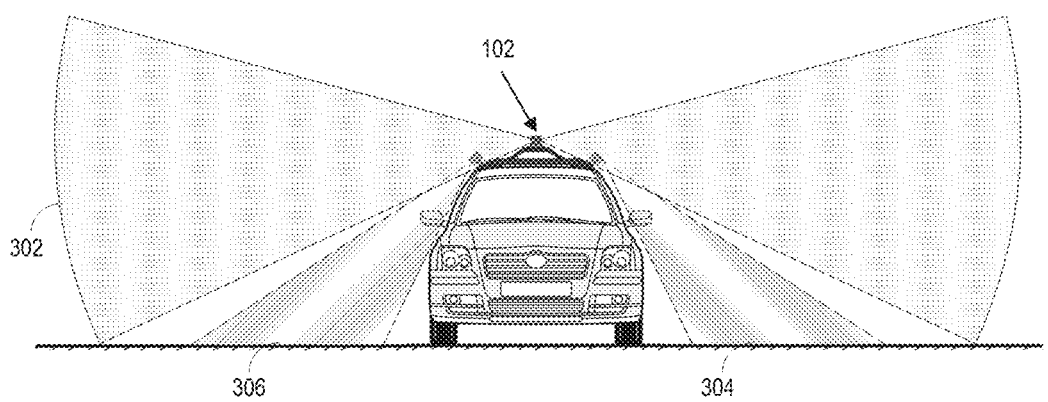
FIG. 3 illustrates a schematic diagram of a main view of an exemplary field of view of a LiDAR system, according to embodiments of the disclosure.

FIG. 3 illustrates a schematic diagram of a main view of an exemplary field of view of a LiDAR system, according to embodiments of the disclosure. The range of angles of projection (e.g., angles of laser beams emitted by each of central LiDAR device 202 and first and second auxiliary LiDAR devices 204, 206) can define the FOV of each LiDAR device in which light is to be projected for detection or scanning of an object. The FOV can also define the direction of incident lights, reflected by the object and detected by the receiver. As illustrated in FIG. 3 and from the perspective of the vehicle, a FOV 304 of first auxiliary LiDAR device 204 covers the left side of LiDAR system 102 and a FOV 306 of second auxiliary LiDAR device 206 covers the right side of LiDAR system 102. In some embodiments, FOV 304 is in symmetry with FOV 306. The example illustrated in FIG. 3 demonstrates an example where the first predetermined distance of the central LiDAR device is greater than the second predetermined distance of the multiple auxiliary LiDAR devices. As discussed above, although not shown in FIG. 3, the first predetermined distance can be equal to or smaller than the second predetermined distance according to other embodiments.

Take FOV 304 as an example. Because the central axis of first auxiliary LiDAR device 204 has an angle (e.g., 20 degrees, 30 degrees, or 40 degrees) with the horizontal plane (e.g., a plane parallel to the sea level), FOV 304 may detect objects at or within a certain range (e.g., the second predetermined distance from LiDAR system 102, as disclosed above). Thus, the left-mounted auxiliary LiDAR devices may be configured to detect objects on the left side of the LiDAR system, at or within the second predetermined distance from the LiDAR system. The same mechanism may be applied to right-mounted auxiliary LiDAR devices for detecting objects on the right side of the LiDAR system. In some further embodiments, the scan range of the multiple auxiliary LiDAR devices may be set to collectively cover the entire surrounding of a survey vehicle (e.g., a combined 360-degree FOV), and the blind spots in front of or behind the vehicle may thus be eliminated.

Figure 4:
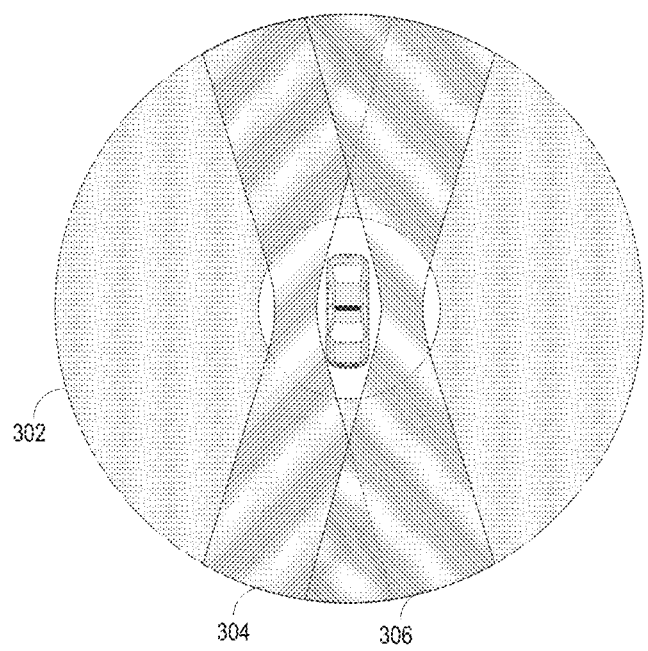
FIG. 4 illustrates a schematic diagram of a top view of an exemplary field of view of a LiDAR system, according to embodiments of the disclosure.

FIG. 4 illustrates a schematic diagram of a top view of an exemplary field of view of a LiDAR system, according to embodiments of the disclosure. As illustrated in FIGS. 3 and 4, a FOV 302 of the central LiDAR device may cover objects at or beyond a certain range (e.g., the first predetermined distance from LiDAR system 102, as disclosed above). Thus, the central LiDAR device may be configured to detect objects at or beyond the first predetermined distance from the LiDAR system. FOVs 304 and 306 of the multiple auxiliary LiDAR devices may cover objects at or within a certain range (e.g., the second predetermined distance from LiDAR system 102 as disclosed above). The multiple auxiliary LiDAR devices may be configured to detect objects at or within the second predetermined distance from the LiDAR system. In some embodiments, there are overlapping between FOVs 302, 304 and 306, and FOVs 304 and 306 are designed to cover blind spots of FOV 302, for example, blind spots in the near-front and near-back.

Because FOVs 302, 304 and 306, when combined together, can cover objects at or within a certain range (e.g., the second predetermined distance from LiDAR system 102, as disclosed above) and objects at or beyond a certain range (e.g., the first predetermined distance from LiDAR system 102, as disclosed above) with fewer or no blind spots, the detection range and accuracy of LiDAR system 102 can be increased. Moreover, because the multiple auxiliary LiDAR devices (e.g., first and second auxiliary LiDAR devices 204, 206) may use a LiDAR device of lower sensitivity because of their auxiliary nature, the cost and the size of LiDAR system 102 may be reduced while achieving better results of detection as compared to conventional LiDAR systems.

The LiDAR systems according to the present disclosure may use a server (e.g. server 160 shown in FIG. 1) to store data frames acquired by the central LiDAR device and the multiple auxiliary LiDAR devices. In some embodiments, the data frames may include and associate with one or more objects within the FOV of the LiDAR system (such as the combined FOV of FOVs 302, 304 and 306). Consistent with the present disclosure, the server may also be able to combine data frames acquired by the central LiDAR device and the multiple auxiliary LiDAR devices, and identifying target objects within the combined data frames. The server may generate maps based on the combined data frames and locate the LiDAR system within the generated maps. The server may receive data frames from and/or send instructions to the central LiDAR device and the multiple auxiliary LiDAR devices. The types of instructions may include those for synchronizing the central LiDAR device and the multiple auxiliary LiDAR devices. The server may communicate with the central LiDAR device and the multiple auxiliary LiDAR devices, or other components of the vehicle to which the LiDAR assembly is mounted, as described above.

Figure 5:
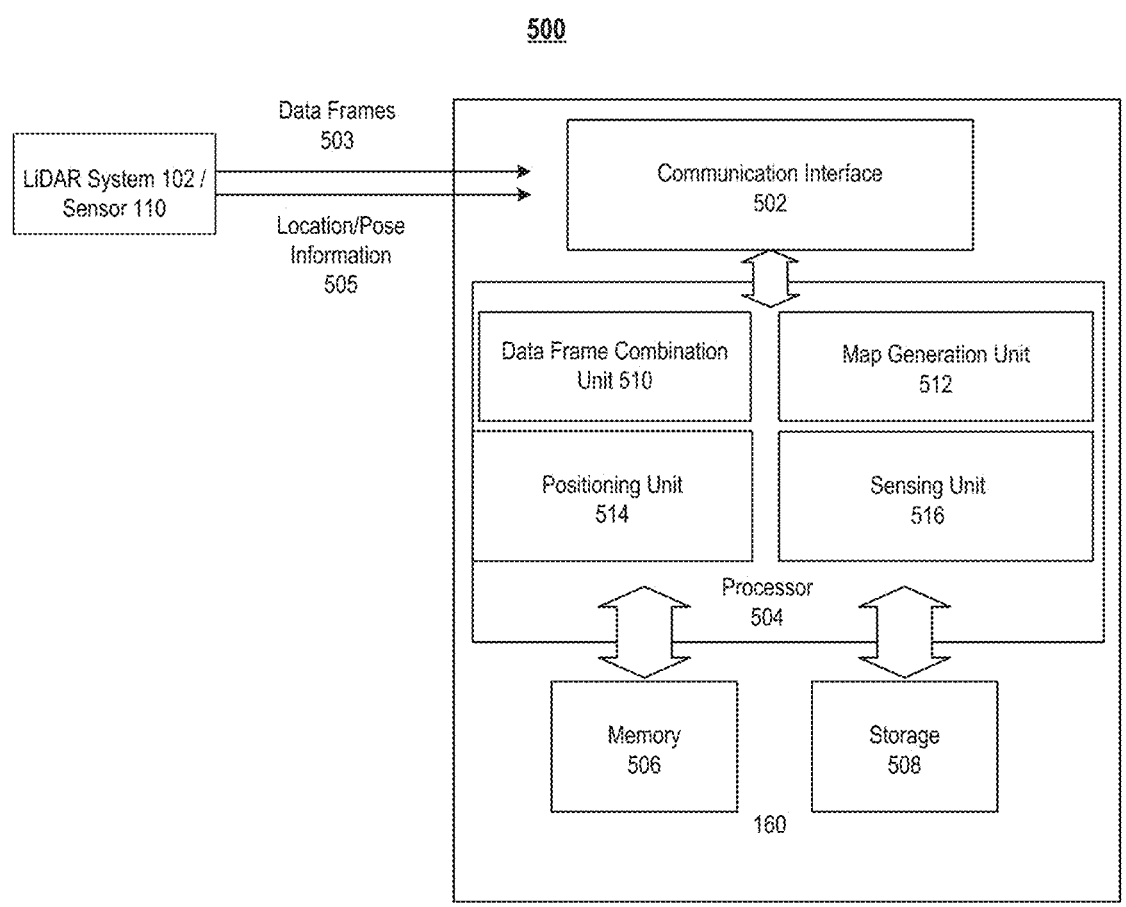
FIG. 5 illustrates a block diagram of an exemplary system for LiDAR detection, according to embodiments of the disclosure.

FIG. 5 illustrates a block diagram of an exemplary system 500 for LiDAR detection, according to embodiments of the disclosure. Consistent with the present disclosure, system 500 may receive data frames 503 from central LiDAR device 202 and multiple auxiliary LiDAR devices, as well as location information and/or pose information 505 from sensor 110. Based on the data frames, system 500 may combine the data frames from different LiDAR devices and identify objects from the combined data frames. System 500 may further generate maps based on the combined data frames, and used the generated maps, along with location/pose information 505, to locate the LiDAR system 102 within the generated maps.

In some embodiments, system 500 may use a fusion algorithm to combine the data frames from different LiDAR devices. For example, system 500 may combine a first data frame acquired by the central LiDAR device with at least one of a plurality of second data frames acquired by the multiple auxiliary LiDAR devices (e.g., first and second auxiliary LiDAR devices 204, 206) by calibrating a relative position between the central LiDAR device and the auxiliary LiDAR device that acquires the at least one of the plurality of second data frames, and performing point cloud fusion of the first data frame and the at least one of the plurality of second data frames. The identified objects may be road marks, curbs, trees, pedestrians, bicycles, vehicles, roadblocks, etc., which are within both the FOV of the central LiDAR device and the FOV of one of the auxiliary LiDAR devices.

In some embodiments, system 500 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of system 500 may be located in a cloud, or may be alternatively located in a single location (such as inside the vehicle or a mobile device) or distributed locations. Components of system 500 may be provided in an integrated device, or distributed at different locations but communicate with each other through a network (not shown).

In some embodiments, as shown in FIG. 5, system 500 may include a communication interface 502, a processor 504, a memory 506, and a storage 508. Communication interface 502 may send data to and receive data from components of the LiDAR system, such as the central LiDAR device, the multiple auxiliary LiDAR devices, and the sensor via a network. In some embodiments, communication interface 502 can be an integrated services digital network (ISDN) card, cable modem, satellite modem, or a modem to provide a data communication connection. As another example, communication interface 502 can be a local area network (LAN) card to provide a data communication connection to a compatible LAN. Wireless links can also be implemented by communication interface 502. In such an implementation, communication interface 502 can send and receive electrical, electromagnetic, or optical signals that carry digital data streams representing various types of information via a network.

Consistent with some embodiments, communication interface 502 may receive data, such as data frames 503 captured by the central LiDAR device and the multiple auxiliary LiDAR devices, as well as location/pose information 505 captured by sensor 110. Communication interface 502 may further provide the received data to storage 508 for storage or to processor 504 for processing. Communication interface 502 may also receive data generated by processor 504 and provide the data to any local component in the vehicle or any remote device via a network. In some embodiments, system 500 may perform data analysis with respect to the data received via communication interface 502, and discover lines, patterns, colors, or other feature information in data frames 503. In these scenarios, system 500 pay pull additional data from sensor 110, such as video or camera images, that contains extra information for subsequent fusion with point clouds.

Processor 504 may include any appropriate type of general-purpose or special-purpose microprocessor, digital signal processor, or microcontroller. Processor 504 may be configured as a separate processor module dedicated to performing LiDAR detection related functions. Alternatively, processor 504 may be configured as a shared processor module for performing other functions unrelated to LiDAR detection.

As shown in FIG. 5, processor 504 may include multiple modules, such as a data frame combination unit 510, a map generation unit 512, a positioning unit 514, a sensing unit 516, and the like. These modules (and any corresponding sub-modules or sub-units) can be hardware units (e.g., portions of an integrated circuit) of processor 504 designed for use with other components or software units implemented by processor 504 through executing at least a part of a program. The program may be stored on a computer-readable medium, and when executed by processor 504, it may perform one or more functions. Although FIG. 5 shows units 510, 512, 514, 516 all within one processor 504, it is contemplated that these units may be distributed among multiple processors located near or remotely with each other. For example, modules related to constructing, updating maps, or positioning (such as data frame combination unit 510, map generation unit 512, positioning unit 514, etc.) may be within a processor on the vehicle. Modules related to object identification (such as a sensing unit 516) may be within a processor on a remote server.

In some embodiments, data frame combination unit 510 may further include a multi-LiDAR synchronization module (not shown in FIG. 5) configured to synchronize the central LiDAR device and the multiple auxiliary LiDAR devices for acquiring data frames. For example, the multi-LiDAR synchronization module may set up a time point when the central LiDAR device and the multiple auxiliary LiDAR devices may start to scan simultaneously based on one or more calibration parameters associated with the central LiDAR device and the multiple auxiliary LiDAR devices. In other embodiments, the multi-LiDAR synchronization module may instead be an individual module inside the vehicle, in a mobile device, or otherwise located remotely from processor 504. For example, remote LiDAR device synchronization may be used to synchronize the multiple LiDAR devices such that they may start to scan at the same time point or match each other's scanning pattern.

System 500 may send the instruction including the synchronizing instruction to the central LiDAR device and multiple auxiliary LiDAR devices using communication interface 502. System 500 may then receive a first data frame corresponding to one or more objects at or beyond a first predetermined distance from the central LiDAR device and a plurality of second data frames corresponding to one or more objects at or within a second predetermined from the multiple auxiliary LiDAR devices.

In some embodiments, data frame combination unit 510 may then use a combining process to combine the first data frame and at least one of the plurality of second data frames. The result of this combination may be called the first combined data frame. In some embodiments, data frame combination unit 510 may further include a calibration fusion module (not shown in FIG. 5) configured to calibrate a relative position between the central LiDAR device and one or more of the multiple auxiliary LiDAR devices. The calibration fusion module may further apply a fusion algorithm to a first data frame from the central LiDAR device and a second data frame from one or more of the auxiliary LiDAR devices.

In some other embodiments, data frame combination unit 510 may also use the same combining process to combine one second data frame acquired by an auxiliary LiDAR device mounted on the left side of the central LiDAR device, with another second data frame acquired by an auxiliary LiDAR device mounted on the right side of the central LiDAR device. The result of this combination may be called the second combined data frame.

In some further embodiments where the number of auxiliary LiDAR devices mounted on one side of the central LiDAR device is equal to or larger than two, the data frame combination unit 510 may also use the same combining process to combine two or more second data frames acquired respectively by two or more auxiliary LiDAR device mounted on the same side (left or right) of the central LiDAR device. The result of this combination may be called the third combined data frame, which may be treated similarly as the second combined data frame with respect to subsequent processing (including calibration, fusion, positioning, and sensing).

According to some embodiments consistent with the current disclosure, when practicing the fusion algorithm, data frame combination unit 510 may first find and match a common object (e.g., road marks, curbs, trees, pedestrians, bicycles, vehicles, roadblocks, etc.) shared by the first data frame and at least one second data frame, then match the common object shared by the first data frame and the at least one second data frame by coinciding the common objects using parallel or rotational movements. For example, data frame combination unit 510 may identify objects within the first data frame and the plurality of second data frames and search for any common object shared by the first and the plurality of second data frames. Data frame combination unit 510 may then record the parallel or rotational movements and calculate a relative position between the central LiDAR device and the auxiliary LiDAR device that captured the at least one second data frame. Data frame combination unit 510 may then transform the at least one second data frame to the coordinate of the first data frame based on the relative position and combine the first data frame and the at least one second data frame to form a combined data frame (e.g., a point cloud).

Map generation unit 512 may be configured to generate maps (e.g., high-definition maps) based on one or more combined data frames, including the first combined data frame and the second combined data frame. For example, 3-D representation of an object within the FOV of the LiDAR devices may be generated based on the point cloud data (e.g., the combined data frames). Map generation unit 512 may then position the 3-D representations of the object to form a map based on their relative positions according to the combined data frames.

Positioning unit 514 may be configured to locate LiDAR system 102 within the generated map. For example, system 500 may use the location/pose information 505 based on data received from sensor 110 through communication interface 502 as the location of the LiDAR system 102 and locate LiDAR system 102 in the generated maps (e.g., position LiDAR system 102 in the coordinates of the data frames collected by the central LiDAR device) based on the received location.

Sensing unit 516 may be configured to identify one or more target objects within the generated maps. For example, data frame combination unit 510 may be configured to combine a second data frame acquired by a left-mounted auxiliary LiDAR device (e.g., first auxiliary LiDAR device 204) with another second data frame acquired by a right-mounted auxiliary LiDAR device (e.g., second auxiliary LiDAR device 206) based on matching a common object shared by the two second data frames, thus generating a second combined frame in a similar manner as the generation of the first combined data frame. Sensing unit 516 may then identify a target object based on both the first combined data frame and the second combined data frame.

Memory 506 and storage 508 may include any appropriate type of mass storage provided to store any type of information that processor 504 may need to operate. Memory 506 and storage 508 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random access memory (RAM), and a static RAM. Memory 506 and/or storage 508 may be configured to store one or more computer programs that may be executed by processor 504 to perform LiDAR detection related functions disclosed herein. For example, memory 506 and/or storage 508 may be configured to store program (s) that may be executed by processor 504 to combine data frames, generate maps or identify objects.

Memory 506 and/or storage 508 may be further configured to store information and data used by processor 504. For instance, memory 506 and/or storage 508 may be configured to store the various types of data (e.g., data frames, location/pose information, etc.) captured by the central LiDAR device and the multiple auxiliary LiDAR devices. Memory 506 and/or storage 508 may also be configured to store the generated maps. Memory 506 and/or storage 508 may also store intermediate data such as machine learning models, features extracted from point clouds (e.g., combined data frames), calculated confidences, and intermediate maps, etc. The various types of data may be stored permanently, removed periodically, or disregarded immediately after each frame of data is processed.

Figure 6:
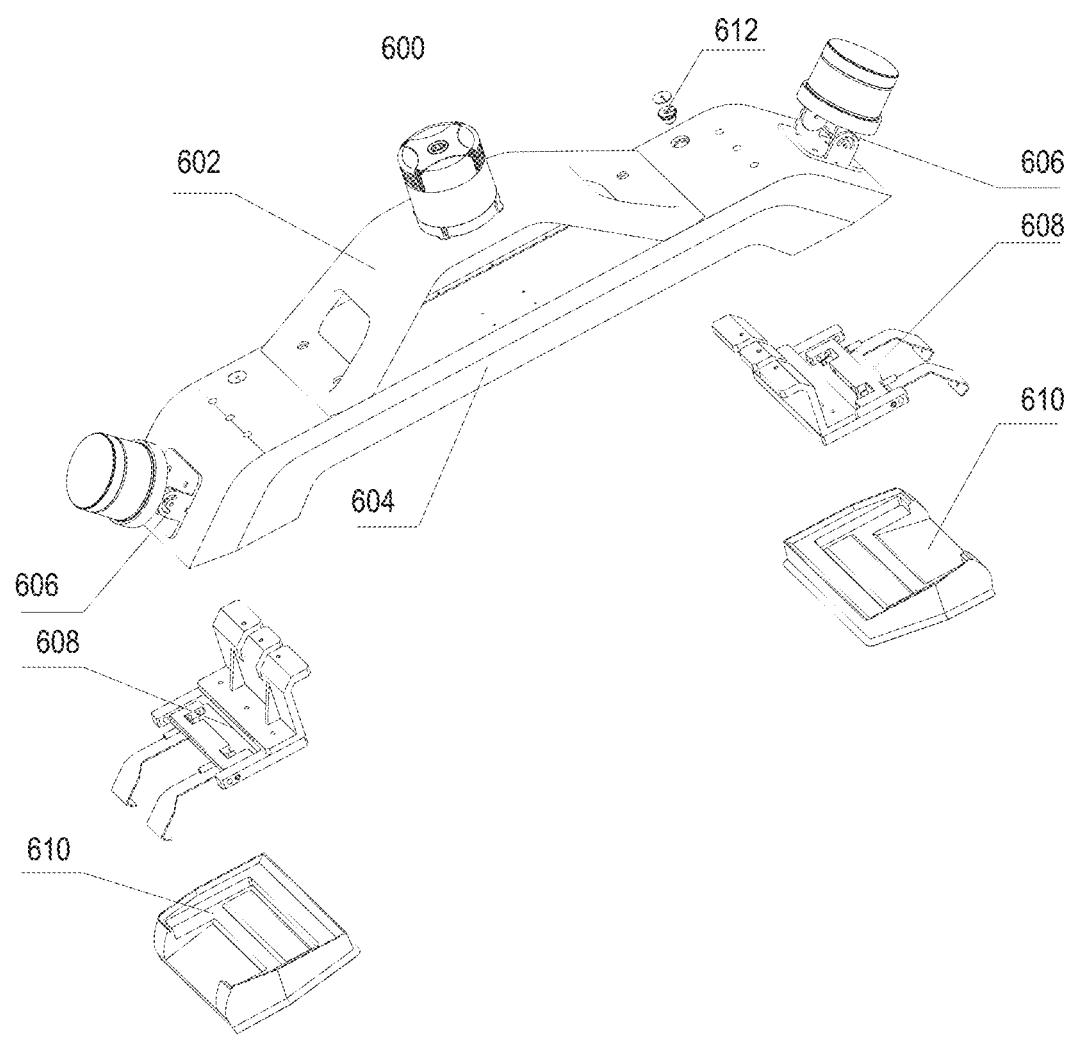
FIG. 6 illustrates a schematic diagram of an exemplary mounting apparatus of the LiDAR assembly, according to embodiments of the disclosure.

FIG. 6 illustrates a schematic diagram of an exemplary mounting apparatus of the LiDAR assembly, according to embodiments of the disclosure. In some embodiments, LiDAR system 102 may be mounted on a mounting apparatus 600. The mounting position of LiDAR devices (e.g., central LiDAR device 202 and multiple auxiliary LiDAR devices 204, 206) may be adjusted such that the relative position between each of the LiDAR devices, the relative position between any LiDAR device and the horizontal plane (e.g., a plane parallel to the sea level), and the FOV of each of the LiDAR devices are all adjustable. The adjustments may be made to accommodate different types of survey vehicle, different road conditions, and different driving requirement (e.g., the complication of the road condition, or the maximized driving speed of the vehicle). In this way, the overall cost of the LiDAR system will be reduced, and the adaptability of the LiDAR system will be increased.

In some embodiments, mounting apparatus 600 may include an upper part 602, a lower part 604, a base 606, an installer 608, a damping structure 610 and a wire-fixing device 612. As illustrated in FIG. 6, upper part 602 is disposed on the upside of lower part 604, and base 606 is disposed on both right and left sides of lower part 604. In some embodiments, upper part 602 is configured to mount the central LiDAR device and lower part 604 is configured to mount the multiple auxiliary LiDAR device. In some other embodiments, a base 606 is configured to be mounted to the lower part, and one or more of the multiple auxiliary LiDAR devices are mounted to the base.

According to some embodiments consistent with the current disclosure, a first mounting surface between the central LiDAR device and upper part 602 of mounting apparatus 600 has an angle with at least a second mounting surface between one of the multiple auxiliary LiDAR devices and base 606 of mounting apparatus 600. The angle may be non-zero. Because of the existence of the angle, the detectable area of the central LiDAR device may be distinguishable from that of the one auxiliary LiDAR device, both of which may thus be used for different purposes or applications.

Figure 7:
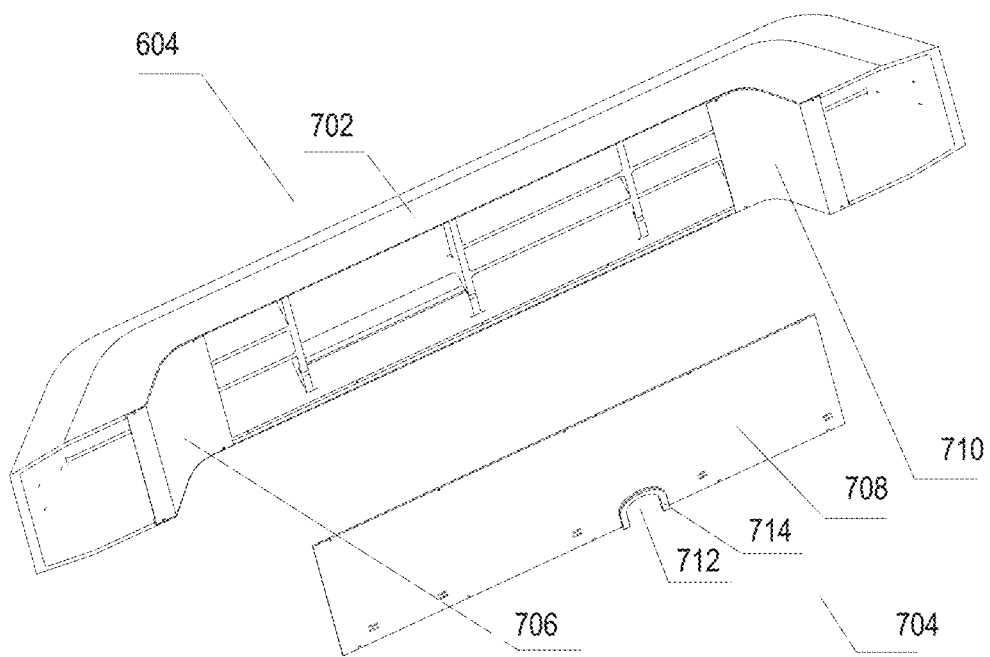
FIG. 7 illustrates a schematic diagram of an exemplary lower part of a mounting apparatus of the LiDAR assembly, according to embodiments of the disclosure.

FIG. 7 illustrates a schematic diagram of an exemplary lower part 604 of mounting apparatus 600 of the LiDAR assembly, according to embodiments of the disclosure. As illustrated in FIG. 7, lower part 604 may include a frame shell 702 and a bottom plate assembly 704. In some embodiments, frame shell 702 and bottom plate assembly 704 may be configured to form a cavity configured to receive wires and other accessory equipment. In some embodiments, bottom plate assembly 704 may include a left board 706, a middle board 708, and a right board 710. Left board 706 and right board 710 are disposed on the bottom of frame shell 702. Middle board 708 may be detachable to frame shell 702. A U-shaped plate 712 may be disposed on middle board 708, and a protective pad 714 may be disposed on U-shaped plate 712. Accessory equipment such as sensing systems and the corresponding wires may be disposed in the cavity formed by frame shell 702 and bottom plate assembly 704 so that the system may be kept concise. Middle board 708 may be detachable such that the system may be easy to setup and install. U-shaped plate 712 and protective pad 714 may be disposed to allow a wire to go through while protecting the wire from being cut by the edge of middle board 708 which may otherwise cause malfunctions of the electronic system.

Figure 8:
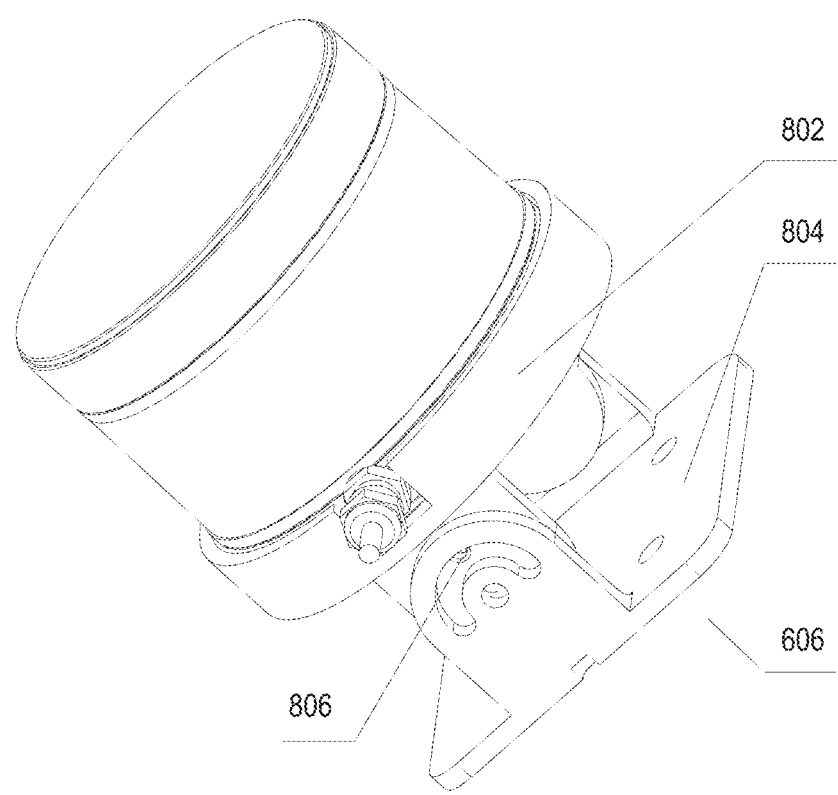
FIG. 8 illustrates a schematic diagram of an exemplary sensing device base of the base of the LiDAR assembly, according to embodiments of the disclosure.

FIG. 8 illustrates a schematic diagram of an exemplary base 606 of the LiDAR assembly, according to embodiments of the disclosure. In some embodiments, base 606 may include two or more similar or identical structures, such as LiDAR device bases for mounting the multiple auxiliary LiDAR devices (e.g., a first LiDAR device base for mounting first auxiliary LiDAR device 204 and a second LiDAR device base for mounting second auxiliary LiDAR device 206). As illustrated in FIG. 8, a LiDAR device base may include a LiDAR device holder 802 and a frame 804. In some embodiments, frame 804 may be disposed on an upper surface of lower part 604, and sensing device holder 802 may be adjustably connected to frame 804 through at least one fastener 806. Sensing device holder 802 may rotate around frame 804. When being adjusted to a working position, the relative position of sensing device holder 802 is locked to frame 804 by at least one fastener 806. In some embodiments, the working angle of each of the multiple LiDAR device bases may be adjusted to alter their respective angles of projection, such that the LiDAR system may be applied to perform detections in different scenarios with different detection range.

Figure 9:
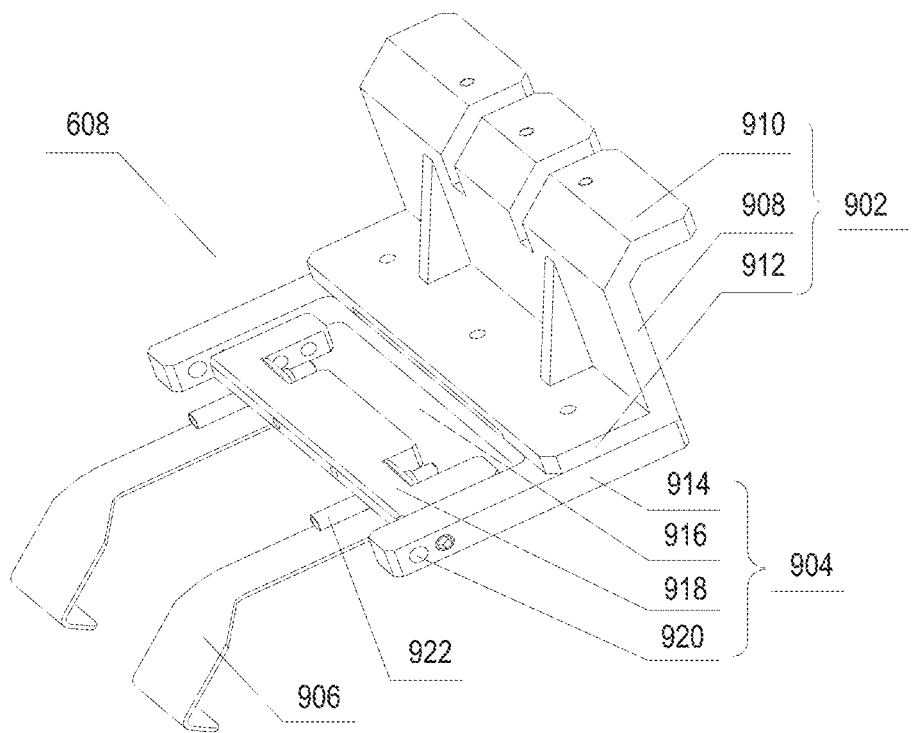
FIG. 9 illustrates a schematic diagram of an exemplary installer of the LiDAR assembly, according to embodiments of the disclosure.

FIG. 9 illustrates a schematic diagram of an exemplary installer 608 of the LiDAR assembly, according to embodiments of the disclosure. As illustrated in FIG. 9, installer 608 may include a Z-frame 902, a connector 904, and a hook 906. In some embodiments, a first end of Z-frame 902 is connected to lower part 604 of the mounting apparatus. A second end of Z-frame 902 opposite to the first end of Z-frame 902 is connected to connector 904. Connector 904 is connected to hook 906. For example, as illustrated in FIG. 9, Z-frame 902 may include an erected plate 908, an upper lateral plate 910, and a lower lateral plate 912. The upper and lower lateral plates 910, 912 may be perpendicular to erected plate 908. Upper lateral plate 910 is connected to lower part 604. Lower lateral plate 912 is connected to connector 904.

In some embodiments, connector 904 may further include a U-shaped plate 914, a movable block 916, and a fixed block 918. Movable block 916 is connected to fixed block 918. In some embodiments, U-shaped plate 914 and movable block 916 include a plurality of positioning holes 920 where a relative position of U-shaped plate 914 and movable block 916 is adjusted by alignment pins passing through the plurality of positioning holes 920 disposed on U-shaped plate 914 and movable block 916 respectively. In some embodiments, a first end of hook 906 is connected to movable block 916 through an adjusting screw rod 922, and fixed block 918 clamps hook 906 to limit its position.

When installed on a survey vehicle (e.g., vehicle 100), one end of hook 906 is connected to movable block 916. Fixed block 918 may gauge and press one end of hook 906. The other end of hook 906 extend to and hook on a top of the survey vehicle. Movable block 916 move to U-shaped plate 914. As a result, the corresponding plurality of the positioning holes 920 disposed on U-shaped plate 914 and movable block 916 respectively would be locked by alignment pins passing through them. Screw rod 922 may be used to fine-tune the position of hook 906 to increase reliability of the system.

Figure 10:
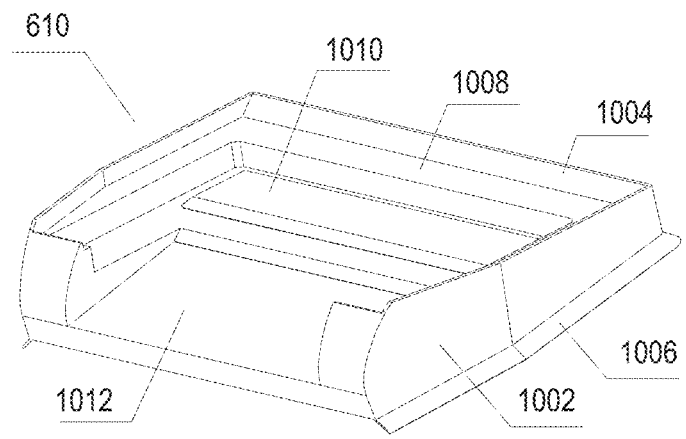
FIG. 10 illustrates a schematic diagram of an exemplary damping structure of the LiDAR assembly, according to embodiments of the disclosure.

FIG. 10 illustrates a schematic diagram of an exemplary damping structure 610 of the LiDAR assembly, according to embodiments of the disclosure. As illustrated in FIG. 10, damping structure 610 may include a damper 1002, an upper skirt 1004, and a lower skirt 1006. Upper skirt 1004 is connected to lower part 604 of mounting apparatus 600. Lower skirt 1006 is tilted outward and connected to a body of the survey vehicle (e.g., vehicle 100). In some embodiments, an inner surface of upper skirt 1004 includes steps 1008 for contact with both ends of lower part 604 of mounting apparatus 600. In some embodiments, a platform 1010 configured to install installer 608 is disposed on an upper surface of damper 1002. A slope 1012 configured to extend hook 906 is disposed on one side of platform 1010. In some embodiments, damping structure 610 may be configured to connect lower part 604 and the survey vehicle (e.g., vehicle 100). For example, both sides of lower part 604 may be disposed on steps 1008 of damping structure 610 such that the LiDAR assembly may still work stably and ensure a good detection performance when experiencing bumping road conditions. Meanwhile, upper skirt 1004 and lower skirt 1006 may be used to compensate assembly clearance caused by the difference between different modes of vehicles.

Figure 11:
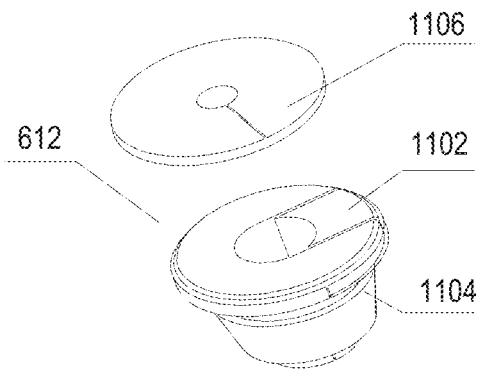
FIG. 11 illustrates a schematic diagram of an exemplary wire fixing device of the LiDAR assembly, according to embodiments of the disclosure.

FIG. 11 illustrates a schematic diagram of an exemplary wire-fixing device 612 of the LiDAR assembly, according to embodiments of the disclosure. As illustrated in FIG. 11, wire-fixing device 612 may include a pressing piece 1102, a wire protection buckle 1104, and a waterproof pad 1106. In some embodiments, waterproof pad 1106 and wire protection buckle 1104 are disposed in sequence on a wire of the LiDAR assembly. After being pressed to wire protection buckle 1104, pressing piece 1102 is disposed on lower part 604 of mounting apparatus 600.

Figure 12:
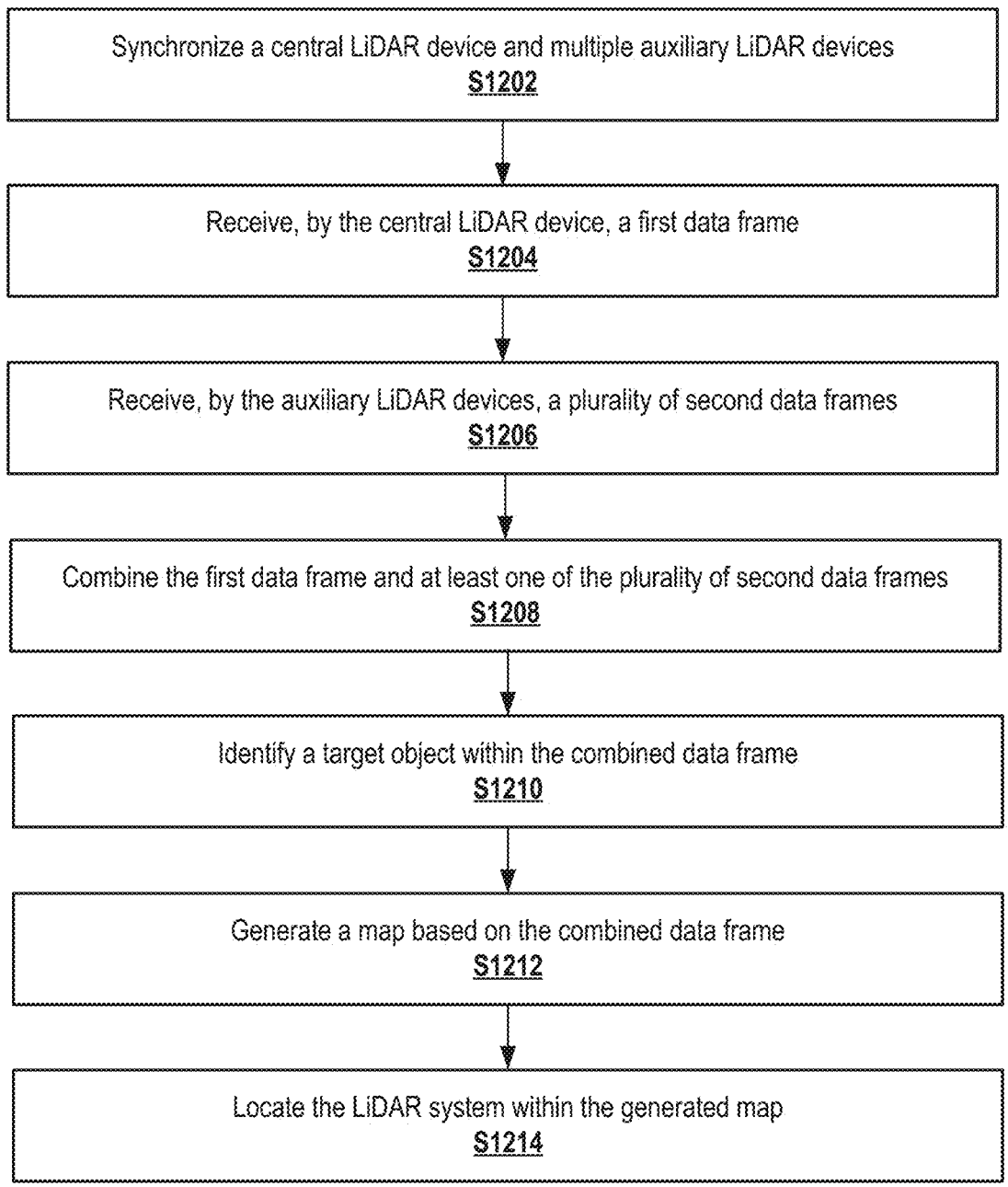
FIG. 12 illustrates a flowchart of an exemplary method for detection by a LiDAR system, according to embodiments of the disclosure.

FIG. 12 illustrates a flowchart of an exemplary method 1200 for detection by a LiDAR system, according to embodiments of the disclosure. In some embodiments, method 1200 may be implemented by LiDAR system 102 combined with system 500 that includes, among other things, a memory 506 and a processor 504 that performs various operations. It is to be appreciated that some of the steps may be optional to perform the disclosure provided herein, and that some steps may be inserted in the flowchart of method 1200 that are consistent with other embodiments according to the current disclosure. Further, some of the steps may be performed simultaneously, or in an order different from that shown in FIG. 12.

Consistent with some embodiments, in step S1202, a server may synchronize a central LiDAR device and multiple auxiliary LiDAR devices for acquiring data frames. For example, the server may set up a time point when the central LiDAR device and the multiple auxiliary LiDAR devices may start to scan simultaneously based on one or more calibration parameters associated with the central LiDAR device and the multiple auxiliary LiDAR devices. For example, a LiDAR device synchronization method may be used to synchronize LiDAR devices such that they may start to scan at the same time point or match each other's scanning pattern.

In steps S1204 and S1206, the server may receive data such as data frames captured by the central LiDAR device and the multiple auxiliary LiDAR devices, as well as location/pose information captured by a sensor. For example, the server may receive a first data frame corresponding to an object at or beyond a first predetermined distance from the central LiDAR device and a plurality of second data frames corresponding an object at or within a second predetermined from multiple auxiliary LiDAR devices.

In step S1208, the server may use a combining process to combine the first data frame and at least one of the plurality of second data frames. In some embodiments, it may calibrate a relative position between the central LiDAR device and one or more of the multiple auxiliary LiDAR device. It may further use a fusion algorithm with respect to a first data frame from the central LiDAR device and a second data frame from one or more of the auxiliary LiDAR devices. The server may also use the same combining process to combine one second data frame acquired by an auxiliary LiDAR device mounted on the left side of the central LiDAR device, with another second data frame acquired by an auxiliary LiDAR device mounted on the right side of the central LiDAR device. When practicing the fusion algorithm, the server may first find and match a common object (e.g., road marks, curbs, trees, pedestrians, bicycles, vehicles, roadblocks, etc.) shared by the first data frame and the at least one second data frame, then match the common object shared by the first data frame and the at least one second data frame by coinciding the comment object using parallel or rotational movements.

In some embodiments, the server may position objects within the first data frame and the plurality of second data frames and search for the common object shared by the first data frame and the plurality of second data frames. The server may then record the parallel or rotational movements and calculate a relative position between the central LiDAR device and the auxiliary LiDAR device that captured the at least one second data frame. The server may then transform the at least one second data frame to the coordinate of the first data frame based on the relative position and combine the first data frame and the at least one second data frame to from a combined data frame (e.g., a point cloud).

In step S1210, the server may be configured to identify a target object within the combined data frame(s). In some other embodiments, the server may be configured to combine a second data frame acquired by a left-mounted auxiliary LiDAR device with another second data frame acquired by a right-mounted auxiliary LiDAR device based on matching a common object shared by the two second data frames and generate a second combined frame in a similar manner as generation of the first combined data frame. The server may then identify a target object based on both the first combined data frame and the second combined data frame.

In step S1212, the server may generate a map (e.g., a high-definition map) based on the combined data frame. For example, 3-D representations of an object within the FOV of the LiDAR system may be generated based on the point cloud data (e.g., the combined data frames). The server may then position the 3-D representation of the object to form a map based on their relative position according to the data frames combined in step S1208.

In step S1214, the server may be configured to locate the LiDAR system within the generated map. For example, the server may use location/pose information of the LiDAR system based on data received from the sensor as location of the LiDAR system and locate the LiDAR system in the generated maps (e.g., position LiDAR system in the coordinates of the data frames collected by the central LiDAR device).

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A LiDAR assembly comprising:
a central LiDAR device configured to detect an object at or beyond a first predetermined distance from the LiDAR assembly;
an even number of multiple auxiliary LiDAR devices configured to detect an object at or within a second predetermined distance from the LiDAR assembly;
a mounting apparatus configured to mount the central and auxiliary LiDAR devices,
wherein each of the central and auxiliary LiDAR devices is mounted to the mounting apparatus via a mounting surface,
wherein a first mounting surface between the central LiDAR device and the mounting apparatus has an angle with a second mounting surface between one of the auxiliary LiDAR devices and the mounting apparatus,
wherein the mounting apparatus further comprises an upper part configured to mount the central LiDAR device, and a lower part configured to mount one or more of the multiple auxiliary LiDAR devices,
wherein the mounting apparatus further comprises a base configured to be mounted to the lower part,
wherein the one or more of the multiple auxiliary LiDAR devices are mounted to the base,
wherein the base of the mounting apparatus further comprises a first LiDAR device base and a second LiDAR device base,
wherein each of the first and second LiDAR device bases comprises a LiDAR device holder and a frame,
wherein each frame of the first and second LiDAR device bases is disposed on an end of an upper surface of the lower part of the mounting apparatus, and
wherein each LiDAR device holder of the first and second LiDAR device bases is adjustably connected to each frame of the first and second LiDAR device bases through at least one fastener.

2. The LiDAR assembly of claim 1, wherein the second predetermined distance is smaller than the first predetermined distance.

3. The LiDAR assembly of claim 1, wherein the number of multiple auxiliary LiDAR devices is two.

4. The LiDAR assembly of claim 1, wherein a central axis of the central LiDAR device is orthogonal to a horizontal plane, and
wherein the central axis of the central LiDAR device is a normal line that passes the center of a bottom plane of the central LiDAR device.

5. The LiDAR assembly of claim 4, wherein a first half of the even number of multiple auxiliary LiDAR devices are mounted on the left side of the central LiDAR device with respect to the central axis, and the other half of the even number of multiple auxiliary LiDAR devices are mounted on the right side of the central LiDAR device with respect to the central axis,
wherein a central axis of one of the left-mounted auxiliary LiDAR devices is in a negative angle with the central axis of the central LiDAR device, and a central axis of one of the right-mounted auxiliary LiDAR devices is in a positive angle with the central axis of the central LiDAR device, and
wherein the central axis of each auxiliary LiDAR device is a normal line that passes the center of a bottom plane of the auxiliary LiDAR device.

6. The LiDAR assembly of claim 1, wherein the mounting apparatus further comprises a Z-frame, a connector, and a hook,
wherein a first end of the Z-frame is connected to the lower part of the mounting apparatus,
wherein a second end of the Z-frame opposite to the first end of the Z-frame is connected to the connector, and
wherein the connector is connected to the hook.

7. The LiDAR assembly of claim 6, wherein the Z-frame further comprises:
an erected plate;
an upper lateral plate; and
a lower lateral plate,
wherein the upper lateral plate is connected to the lower part of the mounting apparatus, and
wherein the lower lateral plate is connected to the connector.

8. The LiDAR assembly of claim 6, wherein the connector of the mounting apparatus further comprises a U-shaped plate, a movable block, and a fixed block,
wherein the movable block is connected to the fixed block,
wherein each of the U-shaped plate and the movable block comprises a plurality of positioning holes, and
wherein a relative position of the U-shaped plate and the movable block is adjusted by alignment pins passing through the plurality of positioning holes disposed on the U-shaped plate and the movable block respectively.

9. The LiDAR assembly of claim 8, wherein a first end of the hook is connected to the movable block of the mounting apparatus through an adjusting screw rod, and
wherein the fixed block clamps the hook to limit its position.

10. A LiDAR assembly comprising:
a central LiDAR device configured to detect an object at or beyond a first predetermined distance from the LiDAR assembly;
an even number of multiple auxiliary LiDAR devices configured to detect an object at or within a second predetermined distance from the LiDAR assembly;
a mounting apparatus configured to mount the central and auxiliary LiDAR devices,
wherein each of the central and auxiliary LiDAR devices is mounted to the mounting apparatus via a mounting surface,
wherein a first mounting surface between the central LiDAR device and the mounting apparatus has an angle with a second mounting surface between one of the auxiliary LiDAR devices and the mounting apparatus,
wherein the mounting apparatus further comprises an upper part configured to mount the central LiDAR device, and a lower part configured to mount one or more of the multiple auxiliary LiDAR devices,
wherein the mounting apparatus further comprises a base configured to be mounted to the lower part,
wherein the one or more of the multiple auxiliary LiDAR devices are mounted to the base,
wherein the mounting apparatus further comprises a damping structure that comprises a damper, an upper skirt, and a lower skirt,
wherein the upper skirt is connected to the lower part of the mounting apparatus, and
wherein the lower skirt is tilted outward and connected to a body of a vehicle.

11. The LiDAR assembly of claim 10, wherein an inner surface of the upper skirt includes steps configured to contact both ends of the lower part of the mounting apparatus.

12. A LiDAR assembly comprising:
a central LiDAR device configured to detect an object at or beyond a first predetermined distance from the LiDAR assembly;
an even number of multiple auxiliary LiDAR devices configured to detect an object at or within a second predetermined distance from the LiDAR assembly;
a mounting apparatus configured to mount the central and auxiliary LiDAR devices,
wherein each of the central and auxiliary LiDAR devices is mounted to the mounting apparatus via a mounting surface,
wherein a first mounting surface between the central LiDAR device and the mounting apparatus has an angle with a second mounting surface between one of the auxiliary LiDAR devices and the mounting apparatus,
wherein the mounting apparatus further comprises an upper part configured to mount the central LiDAR device, and a lower part configured to mount one or more of the multiple auxiliary LiDAR devices,
wherein the mounting apparatus further comprises a base configured to be mounted to the lower part,
wherein the one or more of the multiple auxiliary LiDAR devices are mounted to the base,
wherein the lower part of the mounting apparatus further comprises a frame shell and a bottom plate assembly, and
wherein the frame shell and the bottom plate assembly are configured to form a cavity configured to receive wires and accessory equipment.

13. The LiDAR assembly of claim 12, wherein the second predetermined distance is smaller than the first predetermined distance.

14. The LiDAR assembly of claim 12, wherein the number of multiple auxiliary LiDAR devices is two.

15. The LiDAR assembly of claim 12, wherein a central axis of the central LiDAR device is orthogonal to a horizontal plane, and
wherein the central axis of the central LiDAR device is a normal line that passes the center of a bottom plane of the central LiDAR device.

16. A LiDAR assembly comprising:
a central LiDAR device configured to detect an object at or beyond a first predetermined distance from the LiDAR assembly;
an even number of multiple auxiliary LiDAR devices configured to detect an object at or within a second predetermined distance from the LiDAR assembly;
a mounting apparatus configured to mount the central and auxiliary LiDAR devices,
wherein each of the central and auxiliary LiDAR devices is mounted to the mounting apparatus via a mounting surface,
wherein a first mounting surface between the central LiDAR device and the mounting apparatus has an angle with a second mounting surface between one of the auxiliary LiDAR devices and the mounting apparatus,
wherein the mounting apparatus further comprises an upper part configured to mount the central LiDAR device, and a lower part configured to mount one or more of the multiple auxiliary LiDAR devices,
wherein the mounting apparatus further comprises a base configured to be mounted to the lower part,
wherein the one or more of the multiple auxiliary LiDAR devices are mounted to the base,
wherein the mounting apparatus further comprises a wire-fixing device that comprises a pressing piece, a wire protection buckle, and a waterproof pad,
wherein the waterproof pad and the wire protection buckle are disposed in sequence on a wire of the LiDAR assembly, and
wherein, after being pressed to the wire protection buckle, the pressing piece is disposed on the lower part of the mounting apparatus.

17. The LiDAR assembly of claim 16, wherein the second predetermined distance is smaller than the first predetermined distance.

18. The LiDAR assembly of claim 16, wherein the number of multiple auxiliary LiDAR devices is two.

19. The LiDAR assembly of claim 16, wherein a central axis of the central LiDAR device is orthogonal to a horizontal plane, and
wherein the central axis of the central LiDAR device is a normal line that passes the center of a bottom plane of the central LiDAR device.

* * * * *